Patented Mar. 28, 1933

1,902,916

UNITED STATES PATENT OFFICE

OTTO HEINRICH STRECKER, OF DARMSTADT, GERMANY, ASSIGNOR TO THE FIRM DR. OTTO C. STRECKER, OF DARMSTADT, GERMANY, A COMPANY OF GERMANY COMPOSED OF OTTO CARL STRECKER AND GERALD STRECKER AND OTTO HEINRICH STRECKER

PROCESS FOR DECOMPOSING PLANT FIBER MATERIAL BY COOKING WITH PHENOLATES

No Drawing. Application filed June 7, 1930, Serial No. 459,843, and in Germany June 7, 1929.

The decomposition of vegetable fibrous material by cooking with cooking liquors containing phenolates is described inter alia in the earlier U. S. A. Patents 1.658.213, February 7, 1928 and 1.705.424, March 12, 1929.

It has now been found that the organic constituents of the boiling lye or cooking liquor and of the vegetable fibrous material, at all events so long as they are in the presence of one another and consequently reacting on one another, are highly sensitive bodies, which is quite contrary to the views previously held on this subject.

The hitherto known method of carrying out the phenolate process was very satisfactory so long as fresh or little used boiling lyes were always available but on the other hand not where exclusively such phenolic compounds as had been produced from the fibrous materials were re-used as is necessary for efficiency. It has been found in fact that in carrying out the phenolate process it is necessary not only to have regard, to the obtaining of cellulose but first and foremost to take care to maintain the quality of the phenolic bodies present in the boiling lye and also to produce them renewed with the necessary properties and in considerable quantities. This is because the condition of the boiling lye is of the greatest importance for the carrying out of the reactions and for the quality of the products.

All knowledge about the actual conditions had to be obtained in the first instance by experience, and led to the present process which makes possible the production of superior and much more uniform cellulose materials and compounds from the lignin.

It is difficult to describe the whole sequence of difficulties which had to be overcome. There was no preconceived theory concerning any of the chemical reactions and the determination of the number and composition of the products produced in the boiling lye were only to be obtained with great difficulty. In any case these products rendered difficult both the boiling and the further utilization of the products themselves until the process became almost uneconomic. Attempts were made to overcome these difficulties by regular or more frequent additions of fresh lye or by purification by precipitation and separation of the phenolic bodies from the impurities as well as finally by additions of reducing substances to the boiling lye.

By means of the hereinafter described method and the improvements attained thereby, which are the result of many years' experiments and research, the possibilities of the phenolate process are considerably extended and in fact beyond the limits required for the mere recovery of cellulose. No further comprehensive improvement of the phenolate process can now be expected.

The essential result of the investigations resides in the feature of providing and maintaining such conditions upon the cooking of the plant fibre material that the numerous heretofore unknown possibilities of damage to the cooking liquor and the plant fibre material are prevented or at least very greatly limited. The chief means for this purpose resides in carrying out the individual cooking in such manner that the presence of an unusually rich amount of phenol-like substances in the cooking liquor is made certain. Inasmuch as the alkali which is present in the old liquor has a stronger injurious effect upon the material to be cooked than in the fresh liquor, a particular counteracting of the same is produced thereby. The compensation for this now lies in the maintenance thereby made possible of, at times, at least one-half greater proportion of free phenol-like substances than would correspond to the phenol-like substances combined with the alkali in the cooking liquor. Further details of this will be evident from the following explanations:

The presence of an excess of phenol-like substances is indeed not new in the phenolate process, because great amounts of phenol-like substances always are developed at the highest temperatures, so that, at least then, an excess thereof would have to be present. This excess, formerly obtainable without any addition, is, however, approximately only the lower limit which is still capable of affording any advantage. For in order to maintain such heretofore non-attainable amounts of phenol-like substances, the recognition of the fact that the yield of phenol-like substances from the plant fibre material as well as the quality thereof can be at all, and in fact very powerfully, affected, has been the underlying principle. Most interesting in this connection is the effect of the so-called aerobic ferments and similar bodies on the phenolate lye and on the sodium carbonate which is also present as a complementary substance. These ferments and enzymes which play an important part in the breathing of the plant are still extremely effective even in very old wood which has been stored for some years. On account of these there occurs a decomposition of carbon dioxide or even of sodium carbonate above certain concentrations, and further of the phenolic bodies and probably of the vegetable fibrous material itself, and in the two last mentioned cases very considerable harm is done either directly or indirectly. These reactions actually take place upon heating the vegetable fibrous materials with the phenolate lye and even at high temperatures up to 100° C. and with extreme rapidity.

The remedy consists in rendering the bodies concerned inactive in any manner by sufficiently heating the vegetable fibrous material before subjecting it to the phenolate process.

This effect is most efficiently obtained by introducing the suitably heated boiling lye suddenly in batches to the vegetable fibrous material for example by adding them simultaneously from underneath in the boiling vessel and by means of a conduit from above, the metal masses and the material to be boiled being advantageously pre-heated if desired. It is quite sufficient if an initial temperature of 95-105° C. prevails. Until the air has been sufficiently removed the boiling vessel may first of all be left open at the top, if desired through a condenser, since the boiling lye boils at a higher temperature than water. Determination as to whether these measures have produced the complete effect can be made for example by comparison of the $Na_2CO_3$ concentration before and after the treatment. If no decomposition of $Na_2CO_3$ is shown the manner of working is correct, which is also observed from the disappearance of the unpleasant odour of phenolic bodies as known from the old phenolate process.

Considerable attention must also be devoted to the introduction of the basic substances to the boiling lye during the treatment of the vegetable fibrous material by the phenolate process. Herein lies the second great danger, that the phenolic substances and the whole of the vegetable fibrous material can be considerably damaged since very undesirable reactions are very liable to occur.

It has been shown to be disadvantageous immediately to make an approximate replacement of the basic substances from time to time set free from the phenolate present or for that matter even to go beyond that point and to cause the phenolic bodies which are newly formed during the boiling immediately and during the same boiling operation to be utilized to produce additional phenolate. Further, it is absolutely necessary to avoid allowing the introduced alkali to reach the vegetable fibrous material in a free or partially free state, that is to say, not united or not completely united to the components of the boiling lye. No opinion is advanced as to how quickly the formation of phenolate per se can be completed chemically. It is certain, however, that upon introduction of concentrated solutions of basic substances into the boiling lye flocculation of the phenolic bodies readily occurs, and just as by incorrect or momentarily excessive mixture, free basic substance have access to the vegetable fibrous material, settle there and cause damage. Also for several reasons there is a further important condition, namely, that the introduction of alkali should not be direct to the vegetable fibrous material, but preferably it should be introduced as early as possible in the circulation of the cooking liquor.

The temperature at which the addition is made also plays an important part since in general the addition becomes more dangerous with increasing temperature. It is advantageous to entirely discontinue the addition of alkali above the cooking temperature of 160° C.

By means of the steps so far mentioned there is already attained primarily the formation of the necessary amounts of phenol-like substances in the desired quality from the plant fibre material. Starting from this foundation it is possible to work with the better effective high concentrations of phenolate and thereby to produce a less injurious time of cooking because it is shorter. Arising from this is the possibility of effecting sufficient separation effectively to keep the boiling lye fresh and clean for continuous re-use, and this is due to the low limits within which the decomposition phenomena of the phenolic substances and the consequent increase up to twofold as great of the amount of such bodies obtained from the vegetable fibrous material, as compared with the old phenolate process. For it is very important to ensure the possibility of abundantly renewing the boiling lye, since in this way the using up of the phenolic bodies is rendered unimportant.

Due attention, however, must be given also to the following circumstances. Experiments have shown that distinction must be drawn between the dissolution of the phenolic bodies, the loosening of the chemical bonds of the vegetable fibrous material and the severing of the fibre bonds. The loosening is advantageously mainly effected before the application of the highest temperatures. The dissolution of the phenolic bodies on the other hand occurs noticeably only at higher temperatures and starts in the case of the treatment of wood at about 160° C. The severing of the fibre bonds takes place fairly rapidly at 160° C., that is, at the lower limit. It is preferable so to adjust the boiling down of the fibrous tissues with respect to the dissolution of the phenolic bodies that they are both ready in the desired end condition at the same time. According to experience the temperatures should normally be 170–175° C. and these maximum temperatures should be employed for not more than 2½ to 4 hours. In order to attain the desired result, in boiling most kinds of wood an average concentration of phenolate of 5% reckoned in terms of NaOH is normally employed. On account of the various circumstances described above it is preferable to allow the concentration to fall lower at the end of the boiling, for example to about 4 or 4.5%.

During the sudden introduction of the boiling lye, which is continuously in use, and upon introduction of the alkali during boiling, particularly at temperatures over 100° C. and finally with the increase of decomposition at the highest temperatures it is desirable to have an excess of unsaturated phenolic bodies up to from the same amount as to twice as much as corresponds to the amount which is combined in the phenolate already present. In order to be able to carry this out, the process is advantageously worked according to the examples given below. It is curious that measures preferably to be adopted, as already described, and to be described in the following, can easily be combined together.

The addition of alkali during the boiling is preferably so arranged that it is only commenced after a prolonged pre-treatment of the vegetable fibrous material at temperatures below the highest and is mainly or entirely carried out during a sort of cessation of the cooking, that is, after about 40–80 minutes, and indeed within 20–40 minutes, as well at temperatures of the cooking liquor between 70 and 140° C. If the addition is made in sufficiently dilute condition and at a low temperature then, particularly at temperatures below 100° C., the addition may be made without danger, until the phenolic bodies are approaching saturation. The highest phenolate concentrations are preferably attained before reaching the highest temperatures so as to eliminate as far as possible the deleterious effect of the alkali at these temperatures. Within limits the desired highest concentration may be employed at any time during the boiling. It is therefore preferable to reach this concentration at the commencement of the boiling or, better still, through sufficient addition of alkali after the period of pretreatment. The procedure can be so carried out that the alkali is added either partially or wholly in temporarily removed boiling lye. It is better, however, to effect the regular separation of excess of boiling lye not at the end of each boiling operation, but at any rate for the most part during the next boiling and at the end of the pre-treatment, and also is exchange for the corresponding quantity of cold alkali solution. This latter is also then very dilute, so that only slight production costs are entailed. If the maximum phenolate content is produced with this addition, no or very little alkali need be added to the boiling lye at the commencement of the boiling operation. The renewal of the boiling lye or the separation of the excess of phenol is therefore most advantageously effected just before the highest temperatures are reached because the boiling lye is then as pure as possible at the most dangerous temperature zone. Before the commencement of each boiling operation it is arranged that the full volume of boiling lye is employed in the condition in which it is at the end of the operation, the amount of boiling lye removed at the end of the boiling operation being advantageously supplemented by the boiling lyes which had been separated as excess, because the latter are for the most part even purer than the remainder of the boiling lye present in the removed cellulose which are obtained as washing waters.

Normally in always using the same boiling lye the boiling operation in somewhat as follows: For a water content of the wood of 10–14%, 180 kg. of pine wood chips, (picea) or correspondingly 200 kg. of fir wood, (pinus) or about 200–220 kg. of beech wood (fagus) are mixed having regard to what has been said about the treatment of aerobic ferments, with about 800 litres of phenolate lye which has been used several times of about 5–6% concentration reckoned in terms of NaOH. The temperature is maintained for about one to one and one-half hours between 100 and 125° C. without addition of basic substances. The heating is then discontinued and about a quarter of the boiling lye is decanted as excess and set aside. In its place, either immediately or later in the operation, the same amount of aqueous sodium hydrate solution is added over a period of a half to one hour, the precautionary measures above set forth being taken, so that, as calculated, a concentration of 6—6, 5% is produced. Upon renewing the heating and reaching the maximum temperatures necessary the boiling is continued at these temperatures for say another two to three hours. At the conclusion of the boiling operation, the amount of lye that can safely be decanted is taken and supplemented with the strongest or evaporated wash waters or from the surplus portions of the boiling lye up to about the normal volume, if desired also with addition of alkali.

The phenols already transformed by the boiling and the phenolic bodies produced from the vegetable fibrous materials cannot be distilled off by means of superheated steam as experiments have shown, at least not from such lyes as are produced in the decomposition of wood and similar strong woody fibrous materials. The explanation of this resides in the fact that additional products are formed with certain of their components from the fibrous material. Since clearly in the first place the high temperature brings about these additional products this firm combination can likewise be attained for example also in the decomposition of straw, when the low temperatures which are sufficient for this decomposition per se are raised from, for example, 140° C. to about 160° C. This combination is valuable for example for the production of such compounds as are suited to bioligical purposes.

Although no phenolic bodies can be distilled off, the hydrocarbons and similar bodies which are obviously produced in relatively small quantities from the resins of the vegetable fibrous materials can be more or less distilled of, at about 140° C. before the re-use of the boiling lye until no more gas is evolved, or during the dissolution of the phenolic bodies out of the vegetable fibrous material about during the application of the highest temperatures. These hydrocarbons or the gases which likewise obviously are produced from the resins either directly or indirectly tend to prevent the obtaining of good bleachable cellulose and impair the quality of the cellulose. The recovery of the hydrocarbons is frequently carried out but this has not been done with the necessary precaution.

If these deleterious constituents are distilled off, they can be remvoed without any considerable passage of steam since they pass off quite easily. In so far as the distillation occurs during the boiling process it should not be effected by direct relief of the pressure in the vapour space of the boiler. It can be done so as to avoid say deleterious action on the vegetable fibrous material for example in the following manner, namely, by removing them from an auxiliary container which is connected between the circulation pump and the boiler, the suction of the pump on the one hand and a throttle valve between the pump and the boiler on the other hand, acting to produce a vapour space in this auxiliary vessel from which the distillation can take place.

In some cases it is desirable to employ a float to control the throttle valve or some other device for regulating the level of liquid.

An equally important step was the perfection of the measures most favourable to the completion of the boiling process. With a view to preserving the cellulose and phenolic bodies, the pressure and steam in the boiler are not released but the boiling lye is separated whilst as far as possible avoiding the formation of steam within the fibrous material or the escape of steam from the boiler to some extent and in fact only until vapour starts to escape which is preferably brought about by slowly conducting the lye through a throttle valve or a tortuous resistance, or else in a larger vessel in which a controllable counter pressure prevails if desired only a little lower than the release pressure of the steam. It is then advisable to allow in some cases a lowering of the temperature of the remaining contents of the boiler to occur.

As a further protection against damaging attacks and against decomposition and deterioration of the boiling lye a certain known closure against atmospheric gases has been found effective, as for example may be obtained by suitably blowing the cellulose together with the boiling lye or liquid it holds into a closed diffuser.

It is not difficult to produce phenolic substances from vegetable fibrous material. It is however, extremely difficult so to do it with optimum yield that the decompositions and transformations produce substances which are of value in the boiling process and which can be industrially used and readily separated. It may probably be said that the problem is to avoid the influencing of the phenolic bodies towards the formation of carbon and humic acids which are noticeable in the phenolic bodies in their action on the aerobic ferments and oxygen carriers and in connection with the decomposition of carbon dioxide and its previous formation from the cell substance, as well as the formation and deposit of formaldehyde and too solid deposits of substances of aldehyde like structure which are likewise produced from the vegetable fibrous material. Moreover some of the measures which are necessary are connected with the extraordinary strong adsorption phenomena of vegetable fibrous material, cellulose and phenolic bodies. These phenomena are deleterious to the working up of the ready boiled cellulose, but account for the satisfactory ready penetration of the boiling lye into the vegetable fibrous material.

With regard to the cellulose obtained it may be stated that it shows a great degree of purity from woody substances, resin residue and albuminous matters, and at the same time has such good fibrous qualities that the strength and like values which can be determined in the usual manner from paper produced therefrom, are unusually high.

This is certainly due in part to the above mentioned satisfactory penetration of the boiling lye. It is also evident that in contrast with other processes, the age and kind of wood are of secondary importance for the the decomposability. For example, all kinds of coniferous and leaf wood and even for example bamboos can be boiled with the same boiling lye and in the manner described in the example. In every case excellent products and unusually high yields are obtained. In particular when being made into paper the cellulose shows a tendency to form the much desired split fibre. On account of its purity it can be satisfactorily treated in the paper machine, and it also gives excellent artificial silk which shows good general qualities and an unusual softness.

The sugar like substances produced from the vegetable fibrous materials such as mannan and xylan, can also naturally be recovered from the surplus boiling lye as soon as they have been separated from the basic substances by precipitation of the latter. They can be fermented after subjection to treatment with acid. The recovery of the alkali is known, but for several reasons it can be carried out more advantageously by the present process than by the soda process.

I claim as my invention:

1. A process for the purposes set forth, characterized in that the content of free phenol or the like is from time to time during the boiling process, at least about half as great as the amount which corresponds to the alkali content of the phenolates present.

2. A process as claimed in claim 1 characterized in that during the boiling process the greatest phenolate content is employed before the highest temperatures are reached.

3. A process in accordance with claim 4, comprising also the use of such high phenolate concentrations during the application of the highest temperatures that a period of 2½–4 hours is sufficient for the dissolution of the phenolic bodies from the vegetable fibrous material.

4. Process for decomposing plant fibre material by cooking with phenolates for the production of cellulose with the simultaneous formation of phenol-like substances, wherein the injurious effects acting upon the constituents of the cooking liquor and the plant fibre material are suppressed, characterized by the use of such composition of the cooking liquor and such control of the addition of the alkali toward the beginning of the cooking process and during the high pressure portion, that the cooking liquor at times contains at least a 50% greater amount of free phenol-like substances than would correspond to the phenol-like substances combined with alkali found in the cooking liquor.

5. Process in accordance with claim 4, wherein only such plant fibre material is decomposed, whose aerobic ferments and enzymes have already been made ineffective by heating.

6. Process in accordance with claim 4, wherein the cooking liquor is added at the beginning of the cooking process at such temperature and within a few minutes that the average initial temperature amounts to about 95–105° C.

7. Process in accordance with claim 4, wherein the addition of alkali furthermore is so controlled that it takes place only after about 40–80 minutes after the beginning of the cooking and takes place with the greatest possible dilution into the circulation of the cooking liquor, outside of the cooking chamber which contains the plant fibre material, namely within about 20–40 minutes and also at temperatures of the cooking liquor lying between about 70 and 140° C.

8. Process in accordance with claim 4, wherein the regular separation of the no longer needed portion of the cooking liquor, which is necessary for maintaing the cooking liquor fresh, is undertaken only after the partial completion of the next decomposition, namely, in exchange for the amounts of water and alkali necessary for maintaining the cooking liquor and its control.

In testimony whereof I have affixed my signature.

OTTO HEINRICH STRECKER.